(12) United States Patent
Zaltzman et al.

(10) Patent No.: US 8,171,388 B2
(45) Date of Patent: May 1, 2012

(54) TRUST BASED MODERATION

(75) Inventors: Ori Zaltzman, Montreal (CA); Quy Dinh Le, Brisbane, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1063 days.

(21) Appl. No.: 11/941,009

(22) Filed: Nov. 15, 2007

(65) Prior Publication Data
US 2009/0132689 A1 May 21, 2009

(51) Int. Cl.
*G06F 17/00* (2006.01)
(52) U.S. Cl. ......................................................... 715/200
(58) Field of Classification Search .................. 715/273, 715/200, 255
See application file for complete search history.

(56) References Cited

U.S. PATENT DOCUMENTS

| | | | |
|---|---|---|---|
| 5,592,482 A | 1/1997 | Abraham | |
| 6,052,709 A | 4/2000 | Paul | |
| 6,348,875 B1 | 2/2002 | Odinak et al. | |
| 6,393,465 B2 | 5/2002 | Leeds | |
| 6,421,709 B1 | 7/2002 | McCormick et al. | |
| 6,453,327 B1 | 9/2002 | Nielsen | |
| 6,643,686 B1 | 11/2003 | Hall | |
| 6,650,890 B1 | 11/2003 | Irlam et al. | |
| 6,772,196 B1 | 8/2004 | Kirsch et al. | |
| 6,957,259 B1 | 10/2005 | Malik | |
| 7,181,764 B2 | 2/2007 | Zhu et al. | |
| 7,315,826 B1 | 1/2008 | Guheen et al. | |
| 7,373,385 B2 | 5/2008 | Prakash | |
| 7,512,892 B2 * | 3/2009 | Sellers et al. | 715/764 |
| 7,546,523 B2 * | 6/2009 | Aureglia et al. | 715/218 |
| 7,644,063 B2 * | 1/2010 | Bossman et al. | 707/713 |
| 7,694,221 B2 * | 4/2010 | Fortes | 715/249 |
| 7,720,853 B1 * | 5/2010 | Siegel et al. | 707/754 |
| 7,818,678 B2 * | 10/2010 | Massand | 715/751 |
| 7,822,631 B1 * | 10/2010 | Vander Mey et al. | 705/10 |
| 7,840,576 B1 * | 11/2010 | Siegel et al. | 707/755 |
| 7,865,590 B2 * | 1/2011 | Zalewski | 709/224 |

(Continued)

FOREIGN PATENT DOCUMENTS
WO WO-01/31806 5/2001

OTHER PUBLICATIONS

Jurca et al., Truthful Reputation Information in Electronic Markets without Independent Verification, Google 2004, pp. 1-20.*

(Continued)

*Primary Examiner* — Cong-Lac Huynh
(74) *Attorney, Agent, or Firm* — Frommer Lawrence & Haug LLP; Jamie L. Wiegand

(57) ABSTRACT

A network device, system, and method are directed towards detecting trusted reporters and/or abusive users in an online community using reputation event inputs, such as abuse reports. When an abuse report is received for a content item, the combined trust (reputation) of previous reporters on the reported content item and the trust (reputation) of the content author are compared to determine whether to trust the content item. If the content item is un-trusted, the content item may be hidden from public view. In one embodiment, the content item might still be visible to the content author, and/or members in the author's contact list, or the like, while being hidden from another user in the community. In one embodiment, the author may appeal the determined trust, and results of the appeal may be used to modify a trust of at least one reporter.

18 Claims, 8 Drawing Sheets

U.S. PATENT DOCUMENTS

| | | | |
|---|---|---|---|
| 7,870,481 B1* | 1/2011 | Zaud et al. ................. 715/234 | |
| 2003/0051026 A1 | 3/2003 | Carter et al. | |
| 2003/0088627 A1 | 5/2003 | Rothwell et al. | |
| 2004/0006484 A1 | 1/2004 | Manis et al. | |
| 2004/0008990 A1* | 1/2004 | Uno ............................ 398/72 | |
| 2004/0156530 A1 | 8/2004 | Brodsky et al. | |
| 2004/0177110 A1 | 9/2004 | Rounthwaite et al. | |
| 2004/0194027 A1* | 9/2004 | Suzuki et al. ................. 715/515 | |
| 2004/0216034 A1* | 10/2004 | Lection et al. ............. 715/500.1 | |
| 2004/0255122 A1 | 12/2004 | Ingerman et al. | |
| 2005/0091320 A1 | 4/2005 | Kirsch et al. | |
| 2005/0198508 A1* | 9/2005 | Beck ............................ 713/170 | |
| 2006/0015563 A1 | 1/2006 | Judge et al. | |
| 2006/0015942 A1 | 1/2006 | Judge et al. | |
| 2006/0036748 A1* | 2/2006 | Nusbaum et al. ............. 709/228 | |
| 2006/0064755 A1 | 3/2006 | Azadet et al. | |
| 2006/0106700 A1* | 5/2006 | Boren et al. ..................... 705/35 | |
| 2006/0106743 A1 | 5/2006 | Horvitz | |
| 2006/0123348 A1* | 6/2006 | Ross et al. ..................... 715/751 | |
| 2006/0168017 A1 | 7/2006 | Stern et al. | |
| 2006/0168024 A1 | 7/2006 | Mehr et al. | |
| 2006/0195461 A1* | 8/2006 | Lo et al. ........................ 707/100 | |
| 2006/0251068 A1 | 11/2006 | Judge et al. | |
| 2006/0253578 A1 | 11/2006 | Dixon et al. | |
| 2006/0253579 A1 | 11/2006 | Dixon et al. | |
| 2006/0253580 A1 | 11/2006 | Dixon et al. | |
| 2006/0253581 A1 | 11/2006 | Dixon et al. | |
| 2006/0253582 A1 | 11/2006 | Dixon et al. | |
| 2006/0253583 A1 | 11/2006 | Dixon et al. | |
| 2006/0253584 A1 | 11/2006 | Dixon et al. | |
| 2006/0267802 A1 | 11/2006 | Judge et al. | |
| 2007/0027992 A1 | 2/2007 | Judge et al. | |
| 2007/0078699 A1 | 4/2007 | Scott et al. | |
| 2007/0121843 A1* | 5/2007 | Atazky et al. ............. 379/114.13 | |
| 2007/0130350 A1 | 6/2007 | Alperovitch et al. | |
| 2007/0130351 A1 | 6/2007 | Alperovitch et al. | |
| 2007/0136178 A1* | 6/2007 | Wiseman et al. ............... 705/37 | |
| 2007/0150338 A1* | 6/2007 | Malik ............................. 705/14 | |
| 2007/0192855 A1 | 8/2007 | Hulten et al. | |
| 2007/0195779 A1 | 8/2007 | Judge et al. | |
| 2007/0240217 A1 | 10/2007 | Tuvell et al. | |
| 2007/0240218 A1 | 10/2007 | Tuvell et al. | |
| 2007/0240219 A1 | 10/2007 | Tuvell et al. | |
| 2007/0240220 A1 | 10/2007 | Tuvell et al. | |
| 2007/0240221 A1 | 10/2007 | Tuvell et al. | |
| 2007/0240222 A1 | 10/2007 | Tuvell et al. | |
| 2008/0082662 A1* | 4/2008 | Dandliker et al. ............ 709/225 | |
| 2008/0109491 A1* | 5/2008 | Gupta ........................ 707/104.1 | |
| 2008/0137550 A1* | 6/2008 | Jurca et al. .................... 370/252 | |
| 2008/0184366 A1 | 7/2008 | Alperovitch et al. | |
| 2008/0208621 A1 | 8/2008 | Karkanias et al. | |
| 2008/0228574 A1* | 9/2008 | Stewart et al. .................. 705/14 | |
| 2008/0243628 A1* | 10/2008 | Wiseman et al. ............... 705/26 | |
| 2008/0243920 A1* | 10/2008 | Newman et al. ........... 707/104.1 | |
| 2008/0244414 A1* | 10/2008 | Marcoullier et al. ......... 715/738 | |
| 2009/0013041 A1* | 1/2009 | Farmer et al. ................. 709/204 | |
| 2009/0013054 A1* | 1/2009 | Libbey et al. ................. 709/207 | |
| 2009/0049408 A1* | 2/2009 | Naaman et al. ............... 715/835 | |
| 2009/0089853 A1* | 4/2009 | Yoshioka ....................... 725/134 | |
| 2009/0092238 A1 | 4/2009 | Bouvier et al. | |
| 2009/0157667 A1* | 6/2009 | Brougher et al. ................. 707/5 | |
| 2009/0165128 A1* | 6/2009 | McNally et al. ................ 726/21 | |
| 2010/0036969 A1* | 2/2010 | Perry et al. .................... 709/245 | |

OTHER PUBLICATIONS

Silaghi et al., Ruputation-based Trust Management System and their Applicability to Grids, Google 2007, pp. 1-26.*

Swamynathan et al., Globally Decoupled Reputation for Large Distributed Networks, Google 2007, pp. 1-14.*

David et al, Six Degrees of Reputation: the Use and Abuse of Online Review and Recommendation Systems, Nov. 2005, pp. 1-34.*

Fritscher et al., Reputation Systems, Google 2008, pp. 1-30.*

Zacharia et al., Collaborative Reputation Mechanisms for Electronic Marketplaces, Google 2000, pp. 371-388.*

PCT/US2008/080154—Search Report and Written Opinion mailed May 18, 2009.

Slashdot, FAQ—Comments and Moderation#cm600, http://slashdot.org/fq.com-mod.shtml, pp. 1-18, Nov. 15, 2007.

Flickr Community Guidelines, http:/flickr.com/guidelines.gne, pp. 1-3, Nov. 15, 2007.

Craigslist online community, craigslist help > flags and community moderation, http://www.craigslist.org/about/help/flags_and_community_moderation, updated Nov. 7, 2007.

"Bloom Filter," Wikipedia, the free encyclopedia, accessed May 22, 2007, 7 pages http://en.wikipedia.org/wiki/Bloom_filter.

Dhamija, R., "Security Skins: Embedded, Unspoofable Security Indicators," Harvard University, Jun. 19, 2006, 57 pages.

Dhamija, R. et al "Why Phishing Works," Apr. 2006, 10 pages.

Dhamija, R. et al., "The Battle Against Phishing: Dynamic Security Skins," Jul. 2005, 12 pages.

Registration Demonstration; Sign-in From New Device: Sing-in Demonstration, accessed Jun. 13, 2006, 20 pages http://passmarksecurity.breezecentral.com/p70238971.

Kristol, D. et al., "HTTP State Management Mechanism," Network Working Group, Feb. 1997, 21 pages.

Taylor, B., "Sender Reputation in a Large Webmail Service," CEAS 2006—Third Conference on Email and Anti-Spam, Google, Inc., Jul. 27-28, 6 pages.

Taylor, B., "Sender Reputation in a Large Webmail Service CEAS 2006," Google, Inc., Jul. 27, 2006, 19 pages.

Zacharia, G. "Collaboratve Reputation Mechanisms for Electronic Marketplaces," 2000.

Official Communication for U.S. Appl. No. 11/774,460 mailed Jun. 25, 2009.

Official Communication for U.S. Appl. No. 11/774,460 mailed Dec. 18, 2009.

Official Communication for U.S. Appl. No. 11/774,460 mailed May 13, 2010.

Official Communication for U.S. Appl. No. 11/774,460 mailed Dec. 23, 2010.

Official Communication for U.S. Appl. No. 11/945,911 mailed Sep. 2, 2009.

Official Communication for U.S. Appl. No. 11/945,911 mailed Apr. 7, 2010.

Official Communication for U.S. Appl. No. 11/945,911 mailed Jun. 3, 2010.

Official Communication for U.S. Appl. No. 11/945,911 mailed Jul. 16, 2010.

Official Communication for U.S. Appl. No, 11/945,911 mailed Dec. 7, 2010.

* cited by examiner

TRUST BASED MODERATION

TECHNICAL FIELD

The present invention relates generally to content reputation determinations over a network, and more particularly but not exclusively to dynamically determining whether to enable content to be displayed at a content system based, in part, on comparison of a reputation of a content abuse reporter and a reputation of a content author.

BACKGROUND

Today, a large number of websites enable users to post their own content or submit references (such as hyperlinks) to content for display and/or use by others. Such User Generated Content (UGC) based sites tend to be vulnerable to many forms of abuse, including, but not limited to spam, slurs, impersonation, illegal activities, posting of adult or other improper content, copyright violations, harassment, hate speech, exploitation of minors, and so forth, just to name but a few examples. Search engines suffer from the same problems while displaying search results from websites that have been manually submitted to the search engine or automatically discovered by its crawlers.

Moreover, the ease in which a user might create multiple accounts and post abusive content that might be immediately visible to millions of users makes such UGC based sites prime targets for abusers. Systems that enjoy a high level of network traffic may be unable to afford the costs or time of having an administrator examine each posting of content for abuse. Hiring of administrators to perform such tasks might become cost prohibitive for large and very popular UGC sites. However, many of the traditional automatic content filtering mechanisms have been demonstrated to be either ineffective, and/or require large amounts of resources to review posted content to minimize false detections (e.g., improperly detecting or failing to detect abusive content).

Several of today's UGC sites attempt to empower viewers of the content to report abusive content. Unfortunately, some of these reporters of abuse may also select to abuse the reporting system by falsely reporting content, targeting specific users for attack, such as falsely reporting good content to have it deleted, or the like. In some instances, the reporters may even create multiple accounts and use them to falsely report content. In some cases, a reporter might use one account to generate the abusive content, and use another account to report the abusive content, so as to gain trust for the one account. If and when such individuals are detected, they may simply create yet another account under a different identity and continue with their abusive behaviors of either generating abusive content and/or falsely reporting content as abusive. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein.

DETAILED DESCRIPTION OF THE INVENTION

Figure 1:
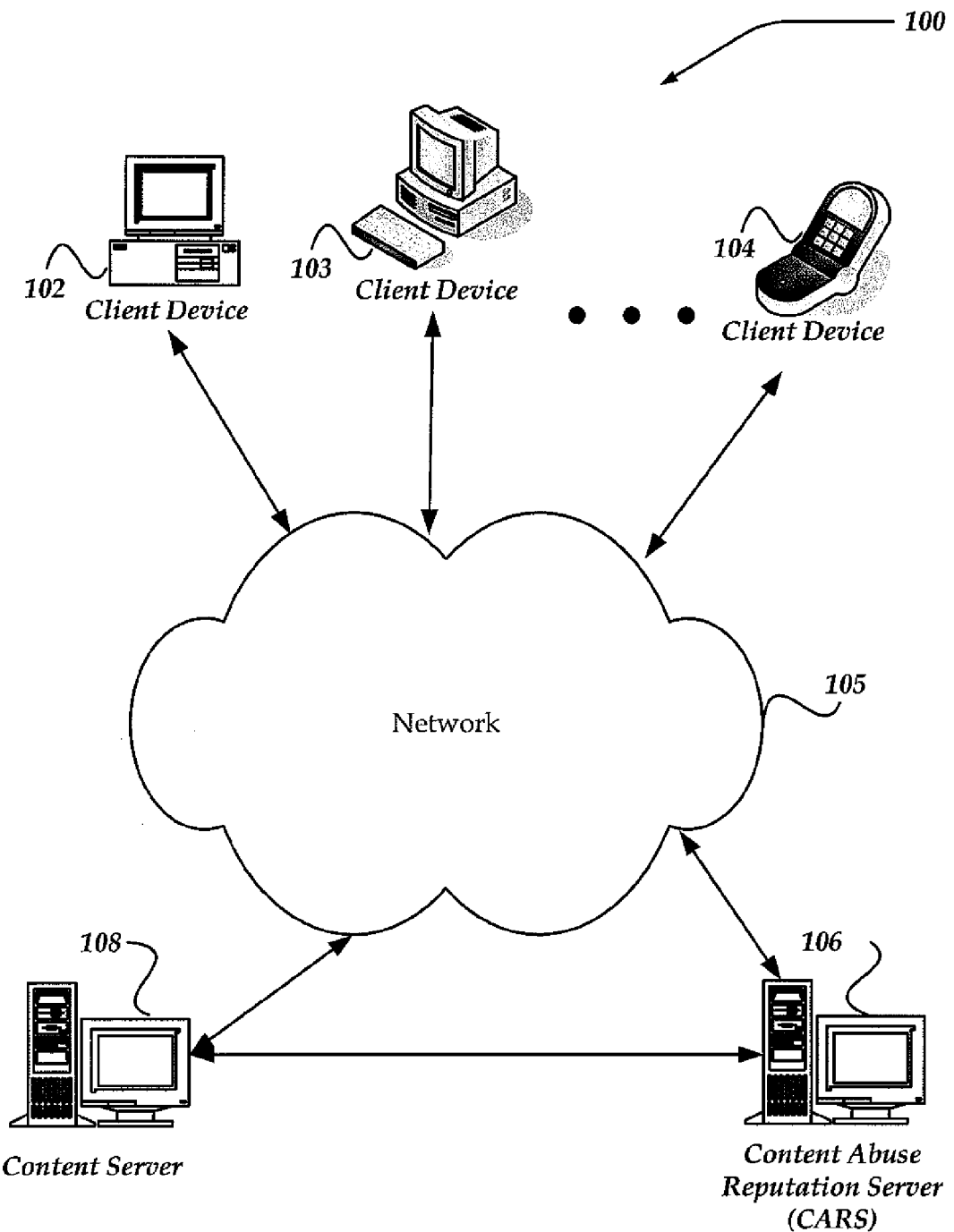
FIG. 1 shows a functional block diagram illustrating one embodiment of an environment for use in managing reputations.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly, the present invention is directed towards a network device, system, and method useable in detecting trusted reporters and/or abusive users in an online community using reputation event inputs, such as abuse reports. When an abuse report is received for a content item, the combined trust (reputation) of previous reporters on the reported content item and the trust (reputation) of the content author are compared to determine whether to trust the content item. If the content item is un-trusted, the content item may be selectively hidden from public view. In one embodiment, the content item might still be visible to the content author, and/or members in the author's contact list, buddy list, members with network addresses within a same or related subnet, or the like, while being hidden from another user in the community.

In one embodiment, the content author may receive a notification indicating that content is hidden. The author may be provided an opportunity to correct the content based on a site policy, or even to discard the content. In one embodiment, the author may appeal the determined reputation, and results of the appeal may be used to modify a reputation of at least one reporter. In one embodiment, rather than reviewing each content posting for abuse, or even each abuse reported, an appeal board might be configured and arranged to focus on those content items for which an author specifically submits a request for appeal, or the board itself so selects. In cases where a content author is identified as a repeat abusive poster, the author's posting permission might be denied, an account for the author might be removed, or each submitted content item by the author might immediately be hidden. In one embodiment, an abuse reporter that abuses the system might also be notified, have their account access revoked, their abuse reports ignored, or the like. By employing a dynamic trusted group in the online community of users to self-moderate content, the community users may become empowered and minimize gaming and abusive behavior.

In one embodiment, the reputation model may include at least two components, one for determining an abuse reporter's reputation, and another for determining an author's reputation. The model may compute and update reputation scores based on a variety of different users' actions over time. Content abuse reputations may be accumulated for each reported content item based on a reputation of previous reporters. The reputation of the abuse reporters, and/or the content author may be based on a variety of factors, including, but not limited to an outcome of a previous report, including an appeal, an investment in the community of users of a website or content site providing the display of the content, abusive behaviors, time of activity, quality of the content, and a variety of other community feedback. In any event, if the content abuse reputation of a specific content item exceeds the trust (reputation) of the content item's author for that content item, the content item may be selectively hidden from display to at least one user of the content server.

Various filtering mechanisms may be employed to minimize or otherwise prevent abuse of the reputation model by, for example, targeting specific users, abusing gained trust, using multiple accounts to report abuse, or the like.

It should be noted that the invention is not constrained by the example applications as disclosed herein. As such, various embodiments may also be used to detect abusive search results, such as web searches, video searches, audio searches, or the like, as well as abusive use of text messaging, emails, user groups, forums, or the like.

Illustrative Environment

FIG. 1 is a functional block diagram illustrating an exemplary operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes client devices 102-104, network 105, content server 108, and Content Abuse Reputation Server (CARS) 106. Client devices 102-104 are in communication with each other, content server 108, and CARS 106 through network 105.

Client devices 102-104 may include virtually any computing device capable of receiving and sending a message over a network, such as network 105, to and from another computing device. The set of such devices described in one embodiment below generally includes computing devices that are usually considered more specialized devices with limited capabilities and typically connect using a wireless communications medium such as cell phones, smart phones, pagers, radio frequency (RF) devices, infrared (IR) devices, integrated devices combining one or more of the preceding devices, or virtually any computing device, and the like. However, the set of such devices may also include devices that are usually considered more general purpose devices and typically connect using a wired communications medium at one or more fixed location such as laptop computers, personal computers, multiprocessor systems, microprocessor-based or programmable consumer electronics, network PCs, and the like. Similarly, client devices 102-104 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 102-104 may include an application that enables a user to perform various operations. For example, each client device may include one or more messenger applications that enables the client device to send and receive messages to/from another computing device employing various communication mechanisms, including, but not limited to Short Message Service (SMS), Multimedia Messaging Service (MMS), Instant Messaging (IM), internet relay chat (IRC), Mardam-Bey's internet relay chat (mIRC), Jabber, email, and the like.

Client devices 102-104 also may include at least one other client application that is configured to provide and receive textual content, multimedia information, or the like. The client application may further provide information that identifies itself, including a type, capability, name, or the like. In one embodiment, mobile devices 102-104 may uniquely identify themselves through any of a variety of mechanisms, including a phone number, Mobile Identification Number (MIN), an electronic serial number (ESN), network address, or other device identifier. In one embodiment, a cookie might be employed to provide an identifier. The information may also indicate a content format that the client device is enabled to employ. Such information may be provided in a message, or the like, sent to, or other computing devices.

Client devices 102-104 may be further configured with a browser application that is configured to receive and to send content in a variety of forms, including, but not limited to markup pages, web-based messages, hyperlinks, video files, audio files, graphical files, file downloads, applets, scripts, text, and the like. The browser application may be configured to receive and display graphics, text, multimedia, and the like, employing virtually any markup based language, including, but not limited to a Handheld Device Markup Language (HDML), such as Wireless Markup Language (WML), WMLScript, JavaScript, and the like, Standard Generalized Markup Language (SGML), HyperText Markup Language (HTML), Extensible Markup Language (XML).

A user of one of client devices 102-104 might provide comments, ratings, or other value judgments about content viewed over the network. For example, the user might view an article, a blog page, an advertisement, a search result, a website, a hyperlink, a product, obtain a service, or the like, from content server 108, or even access and download various content, including, but not limited to music, documents, graphical files, video files, or the like, from content server 108. The user may then provide a comment or other value judgment about the content, product, service, or the like, using content server 108, and/or by sending the comment to CARS 106 directly. Such comment might be configured and organized, in one embodiment, in the form of a reputation statement or report. Such reputation statements might be classified as abuse reports or as positive reports. An abuse report might indicate, for example, that the reporter considers the content to be abusive of a policy, a procedure, a person, or the like. A positive report might indicate that the reporter considers the content worthy of mention as having at least one desirable characteristic.

Figure 8:
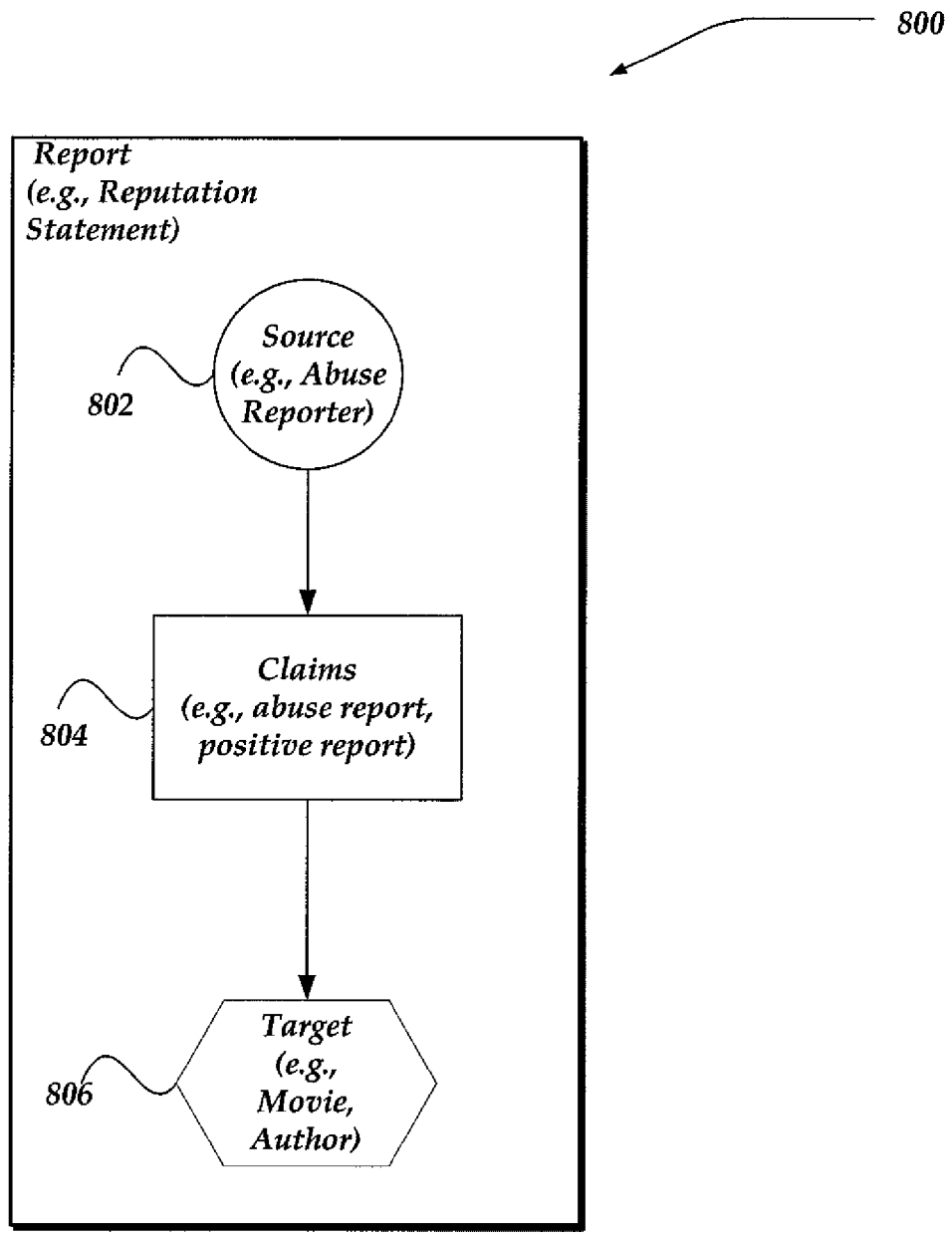
FIG. 8 illustrates a functional block diagram conceptually illustrating one embodiment of an event or reputation statement useable in determining a reputation.

As an aside, one possible conceptual diagram useable to illustrate a reputation statement, abuse report, positive report, or the like, is illustrated in FIG. 8. As shown in FIG. 8, report 800 may include information about a source 802 of the report, a target 806 for which the abuse report is about, and claim 804 indicating a judgment about the target 806. Thus, as illustrated, report 800 represents a statement regarding a value judgment, comment, or claim by source 802 about target 806.

In one embodiment, source 802 includes an identifier indicating the source of report 800. In one embodiment, the source 802 is an abuse reporter, or reporter of a positive report, or the like. In one embodiment, the identifier might be provided by the user as part of inputting and sending the abuse report, positive report, or the like. However, in another embodiment, the identifier might be automatically included such as might occur during preparation of a message (e.g., in a message header), or the like. In one embodiment, the identifier might also be obtained automatically based on a network address, device address, user identifier, user account, or the like, obtained when the user logs in to provide the report 800, or sends the message, or the like. In one embodiment, a cookie, network address (e.g., IP address, device address), or the like, might even be used to determine source 802's identifier.

Target 806 might include information identifying virtually any content item for which the claim 804 is about, including a search result, website, hyperlink, question, answer, video, image, audio, animation, news, user profile, avatar, a blog posting, a review, a board post, a product, a service, a merchant, another review, or virtually any other type of content. For example, where an author of the content might post answers to questions, target 806 may identify the answer posted, a question posted, or the like. However, it should be clear that target 806 may represent virtually any content item that may be accessible by client devices 102-104. Moreover, in one embodiment, target 806 might also identify a class of content items, called content types, such as movies, restaurant reviews, or the like. By enabling report 800 to be directed to content items, an author that provides different types of content may receive different reputations. For example, where the author posts content items associated with music reviews, restaurant reviews, or the like, the author may have one reputation for their music reviews, while a different reputation for their restaurant reviews. However, the author may also receive a reputation per a specific content item, as well. Similarly, a reporter providing a report about content may also receive different reputations based on different types of content types reported.

Moreover, target 806 may include information identifying an author of the content item for which claim 804 is about. However, the invention is not constrained to target 806 including information about the author of the content item. For example, information about the content item may be used to search for and/or otherwise identify an author of the content item. As used here, the term "author" refers to a user that submits content to be posted at content server 108. In addition, the term "author" may also refer to a website or service being crawled by a search engine, or virtually any other source of content. Thus, while an author may, in one embodiment actually compose content that is to be posted through content server 108, the author may also submit content that the author did not directly compose. For example, an author might collect photographs, text, music, graphics, audio files, or the like, and submit them for posting. Similarly, an author might compose an article, music, an audio file, a video file, or the like, and then submit that for posting. Moreover, the author may also combine content that the author directly composed with another's content for submission.

Claim 804 may include comments and/or ratings from source 802 about target 806. A comment may include qualitative elements and may be stored as text in a file, a message, a database, directory, or the like. Claim 804 may include a rating that may also include a quantitative element, employing a variety of mechanisms, including grades, stars, a score, or the like. Claim 804 may include adding an item to favorites, recommendation, sharing with others. For example, in one embodiment, claim 804 might be a judgment that content from target 806 is abusive, not abusive, or the like. As used herein, abuse may include any of a variety of subjective and/or objective criteria, including but not limited to violations of terms of service or guidelines, spam, slurs, impersonation, illegal activities, posting of adult or other improper content, copyright violations, harassment, hate speech, exploitation of minors, or so forth.

Moreover, in one embodiment, content server 108 might provide a selectable icon, form field, or the like, that a user might select or enter a comment into. In one embodiment, one selectable icon might indicate that the user views the content as abusive, for any of a variety of reasons, including, but not limited to failing to comply with content server 108's posting policies, is viewed by the user as attacking the user, another user, or the like. In one embodiment, another selectable icon might indicate that the user views the content as not abusive. In one embodiment, the user might view the content as positive, based on a variety of criteria, thereby submitting a positive report. As such, the user might be able to select either one of the icons as a mechanism for providing report 800. Similarly, the user might have a form field in which the user might enter text useable input claim 804. It should be noted that the invention is not limited to these entry mechanisms, and others may be used, without departing from the scope of the invention.

It should be noted, that while report 800 represents one structure of a representation event or statement, the implementation is not limited to such structure, and other structures may readily be used, including a free form structure, form inputs, a table, or the like.

Returning to FIG. 1, network 105 is configured to couple client devices 102-104, with each other, and/or other network devices. Network 105 is enabled to employ any form of computer readable media for communicating information from one electronic device to another. In one embodiment, network 105 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G), 4th (4G) generation radio access for cellular systems, Wireless-LAN, Wireless Router (WR) mesh, and the like. Access technologies such as 2G, 3G, and future access networks may enable wide area coverage for network devices with various degrees of mobility. For example, network 105 may enable a radio connection through a radio network access such as Global System for Mobil communication (GSM), General Packet Radio Services (GPRS), Enhanced Data GSM Environment (EDGE), Code Division Multiple Access (CDMA), Wideband Code Division Multiple Access (WCDMA), or the like.

Furthermore, remote computers and other related electronic devices could be remotely connected to either LANs or WANs via a modem and temporary telephone link. In essence, network 105 includes any communication method by which information may travel between client devices 102-104, CARS 106, and/or content server 108.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Content server 108 includes virtually any network computing device that is configured to provide various resources, including content and/or services over network 105. As such, content server 108 represents one embodiment of a content system. Content server 108 may provide selective access to any of a variety of user submitted content, including, but not limited to blog content, search results, websites, hyperlinks, user profiles, ads, product/service reviews, merchant reviews, restaurant reviews, entertainment comments/reviews, as well as content that may include audio files, video files, text files, streaming files, graphical files, or the like. Thus, virtually any user generated content may be posted to content server 108, reviewed by a community of users of content server 108, and receive comments and/or reports about such content. Thus, in one embodiment, content server 108 might be configured and arranged to provide a website for users to post, view, and/or provide comments, and other reports on various content. Content server 108 might also provide FTP services, APIs, web services, database services, or the like, to enable users to post, view, and/or comment on content. However, content server 108 is not limited to these mechanisms, and/or content and others are envisaged as well.

Content server 108 may include an interface that may request information from a user of client devices 102-104. For example, content server 108 may provide access to an account, which may request user log-in information. Such log-in information may include a user name, password, or other identifier of the user and/or client device used by the user.

In one embodiment, content server 108 may be configured to send a message to one or more of client devices 102-104 that includes a link to a web page hosted within content server 108. Moreover, content server 108 may select to send a plurality of messages, bulk messages, or the like, to client devices 102-104, including advertisements, or the like.

In addition, content server 108 may also provide a messaging service, such as a list server, or the like. Thus, users of client devices 102-104 might send a message to a plurality of other users through services provided by content server 108, or the like. In one embodiment, the messages might therefore appear to be sent from content server 108 rather than from the user employing such service. Thus, in one embodiment, content server 108 might operate as a message forwarder, a submit server for an Internet Service Provider (ISP), or the like.

Moreover, content server 108 might be configured to operate behind a proxy server, network address translator (NAT), Enhanced Service Provider (ESP), or the like. In such configurations, an actual network address, such as an Internet Protocol (IP) address, or the like, might not be readily discernable.

Devices that may operate as content server 108 include, but are not limited to personal computers, desktop computers, multiprocessor systems, microprocessor-based or programmable consumer electronics, network PCs, servers, network appliances, and the like.

One embodiment of CARS 106 is described in more detail below in conjunction with FIG. 2. Briefly, however, CARS 106 includes virtually any network device that is configured to receive reports about content available through content server 108, and to determine a reputation for various content items based on different users' actions over time. CARS 106 may determine a content item abuse reputation based on a comparison of an accumulated abuse reporter reputation and an overall content creation reputation of an author for the content item. In one embodiment, if CARS 106 determines that the determined accumulated abuse reporter reputation is equal to or exceeds the determined overall content creation reputation for the author for the content item, CARS 106 may enable selective hiding a display of the content item on content server 108.

In one embodiment, CARS 106 may provide an appeals process to an author to enable the author to appeal a reputation of a content item, a reputation of the author, or the like. In one embodiment, a reporter might also be provided an opportunity to appeal their determined reputation. In one embodiment, the author, reporter, or the like, might be provided a time limit in which to appeal, and if the author, reporter, or the like, fails to respond with the time limit, the determined reputation might be maintained and one or more reporters' and/or author's reputations may be adjusted. If the result of the appeal is favorable to the author of the content item, in one embodiment, the hidden content item might be un-hidden. In one embodiment, the result of the appeal might be used to modify a reputation of the author, one or more reporters of the content item, or the like. In one embodiment, the result of the appeal might be employed to modify a reputation of network addresses, members in a buddy list, contact list, sub-network, or the like, that may be associated with the author, the reporter, or the like. In any event, CARS 106 might employ a process such as described below in conjunction with FIGS. 3-7 to perform at least some of its actions.

Devices that may operate as CARS 106 include, but are not limited to personal computers, desktop computers, multiprocessor systems, microprocessor-based or programmable consumer electronics, network PCs, servers, network appliances, and the like. It should be noted that while content server 108 and CARS 106 are illustrated as separate network devices, the invention is not so limited. Thus, for example, content server 108 and CARS 106 might reside within the same network device, without departing from the scope of the invention.

Illustrative Server Environment

Figure 2:
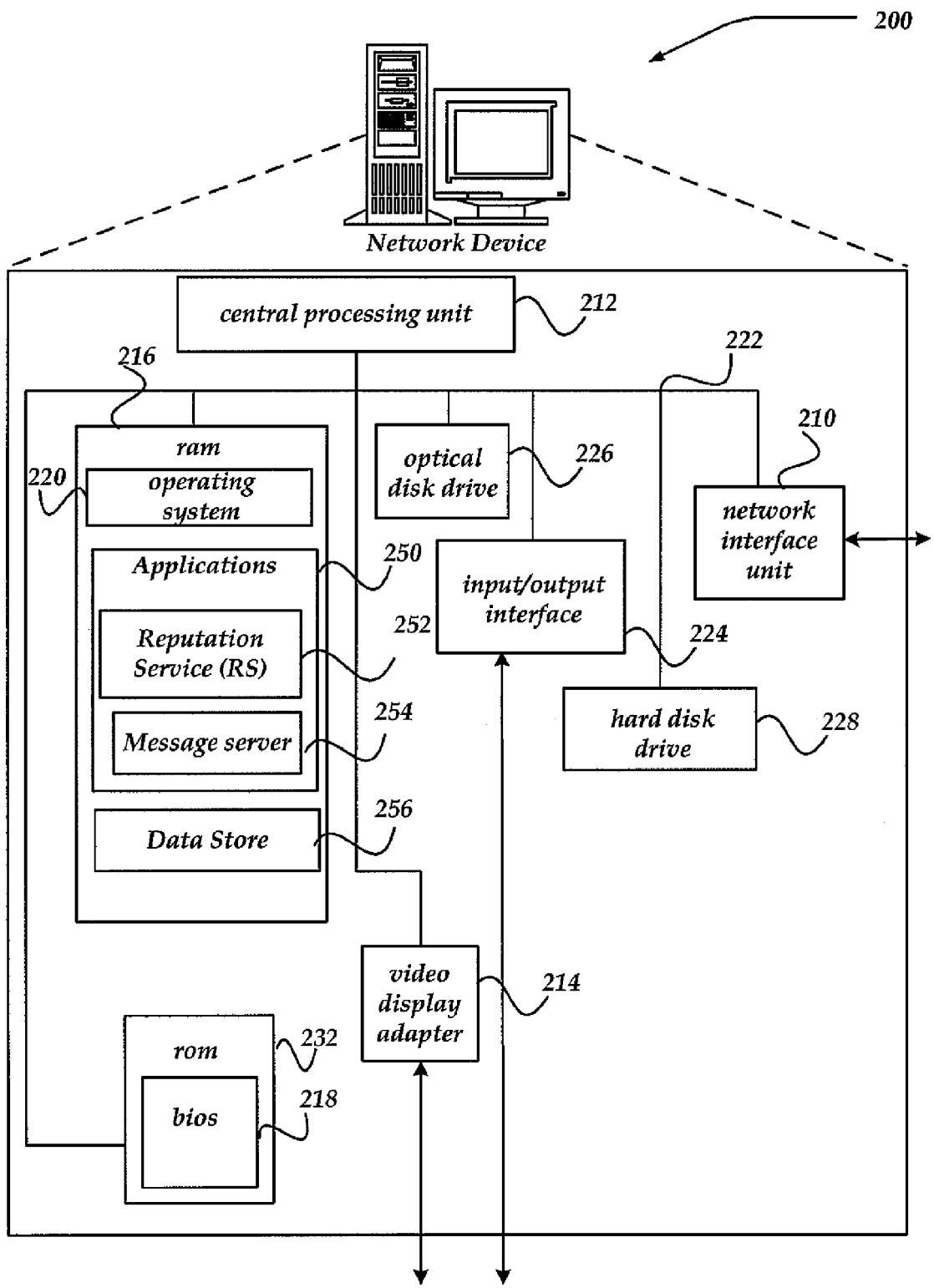
FIG. 2 shows one embodiment of a network device that may be employed within the environment illustrated in FIG. 1.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may, for example, represent CARS 106 of FIG. 1.

Network device 200 includes processing unit 212, video display adapter 214, and a mass memory, all in communication with each other via bus 222. The memory generally includes RAM 216, and ROM 232. Network device 200 also includes one or more mass storage devices, such as hard disk drive 228, tape drive, optical disk drive, and/or floppy disk drive. The memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, network interface card (NIC), or the like.

Network device 200 may also include an SMTP handler application for transmitting and receiving email. Network device 200 may also include an HTTP handler application for receiving and handing HTTP requests, and an HTTPS handler application for handling secure connections. The HTTPS handler application may initiate communication with an external application in a secure fashion.

Network device 200 also may include input/output interface 224 for communicating with external devices, such as a mouse, keyboard, scanner, or other input devices not shown in FIG. 2. Likewise, network device 200 may further include additional mass storage facilities such as optical disk drive 226 and hard disk drive 228. Hard disk drive 228 is utilized by network device 400 to store, among other things, application programs, databases, or the like.

The memory and/or mass storage as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 250 are loaded into memory and run on operating system 220. Examples of application programs include schedulers, calendars, transcoders, database programs, word processing programs, spreadsheet programs, security programs, web servers, and so forth. Mass storage may further include applications such reputation service (RS) 252, message server 254, and data store 256.

Data store 256 is configured and arranged to store and otherwise manage messages, statistical data, reputation reports, volume reports, or the like. Data store 256, however, is not limited to managing storage of these example items, and other items, data, information, or the like, may also be stored within data store 256, without departing from the scope of the invention. For example, data store 256 may also include user account information, policies, procedures or the like, useable for inhibiting delivery of spam, inhibiting display of a content item, appeal report status, or the like. Moreover, data store 256 may be employed to maintain historical data, such as predictions, reputation reports, and the like. Data store 256 may be implemented using a variety of technologies, including, but not limited to, folders, spreadsheets, data bases, scripts, applications, or the like.

Message server 254 may include virtually any computing component or components configured and arranged to forward messages from message user agents, and/or other message servers, or to deliver messages to a local message store, such as data store 256, or the like. Thus, message server 254 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like.

However, message server 254 is not constrained to email messages, and other messaging protocols may also be managed by one or more components of message server 254. Thus, message server 254 may also be configured to manage SMS messages, IM, MMS, IRC, mIRC, or any of a variety of other message types.

In any event, message server 254 may be configured to provide reports to RS 252 indicating information about messages. Such reports may include information about a volume of messages received by users of message server 254, a volume of determined bulk messages received, information about messages received by known fake message addresses (trap reports), Address book entries, or the like.

RS 252 is configured and arranged to receive input from a community of users that include statements about a content item. RS 252 may employ, in part, the received reports or statements, and quickly predict whether the content item should be selectively hidden from display at a network device.

RS 252 may include several sub-components including a component that is configured and arranged to determine an abuse reporter's reputation, and at least another component that is configured and arranged to determine an author's reputation for a content item. As noted above, an author might have different reputations based on different content items. For example, an author might be determined to have a favorable or positive reputation for reviews associated with movies, but an unfavorable reputation for reviews of coffee pots. RS 252 might also include a component that is configured and arranged to make a comparison between the determined reputations and determine whether a content item should be selectively hidden from display. RS 252 might further include another component that is configured and arranged to provide a notification to an author indicating that a content item's reputation. In one embodiment, RS 252 may be configured to enable the author to employ an appeal process to appeal the determined reputation. It should be noted, that a reporter of a comment about a content item might similarly be provided an appeal process to appeal their determined reputation, as well. RS 252 may employ the process described below in conjunction with FIGS. 3-7 to perform at least some of its actions.

Generalized Operation

Figure 3:
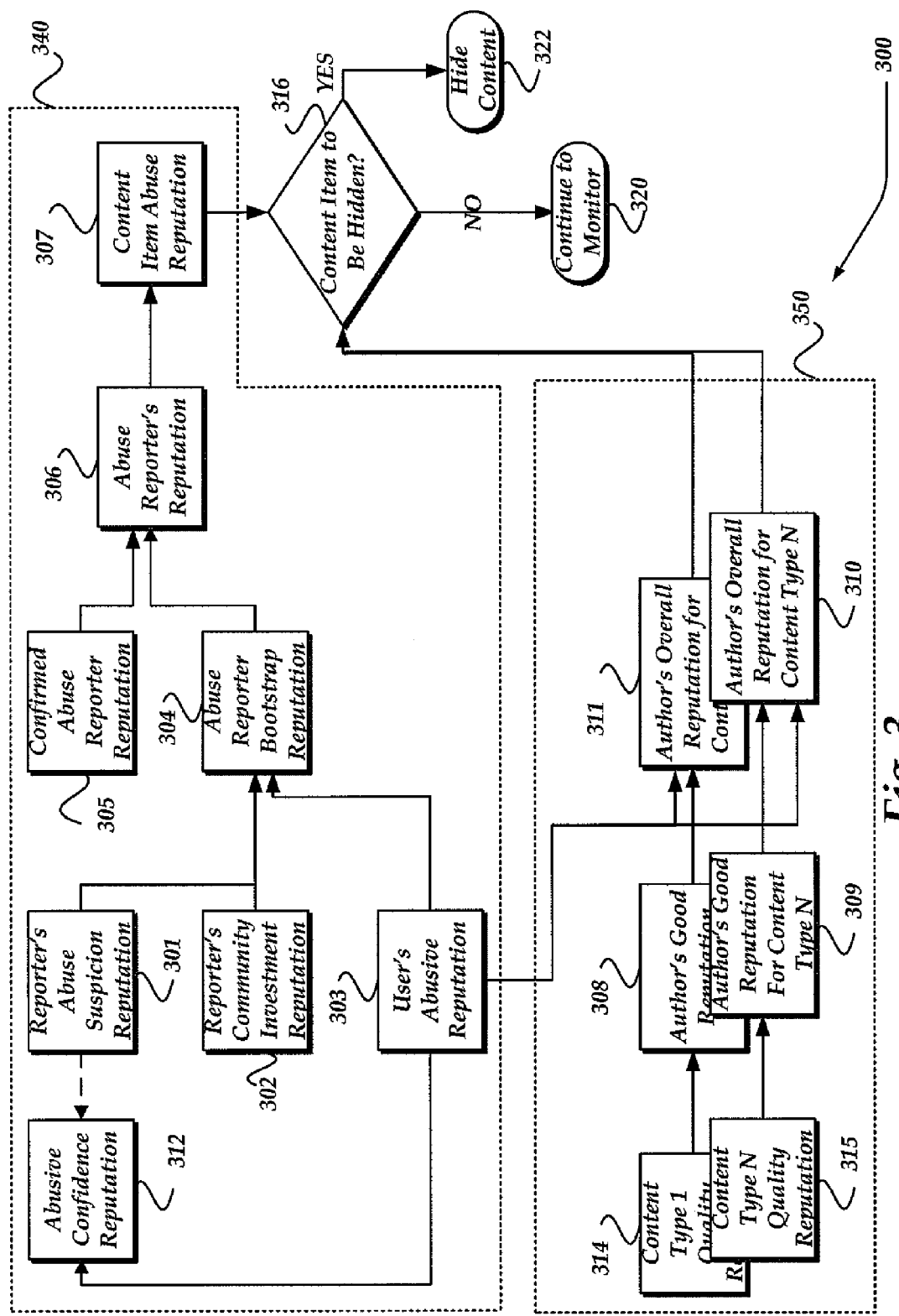
FIG. 3 illustrates a model diagram generally showing one embodiment of an overview of process useable to determine a content item's abuse reputation.

The operation of certain aspects of the present invention will now be described with respect to FIGS. 3-7. FIG. 3 illustrates a model diagram generally showing one embodiment of an overview of process useable to determine a content item's abuse reputation. As shown in the figure, the illustrated blocks may, in one embodiment, represent objects that are configured to perform actions based on an input, such as from another block, an event, or the like. In one embodiment, the blocks may be storable values for a given content item.

Briefly, as shown in FIG. 3, sub-process 340 of model 300 is configured and arranged to determine a content item abuse reputation based, in part, on an accumulated determined reputations for each reporter of abuse reports for the content item. Sub-process 350 of model 300 is configured and arranged to determine a reputation of an author for different content items and content types. Thus, for example, block 311 of sub-process 350 might provide an author's overall reputation for one content item (or type), while block 310 of sub-process 350 might provide the author's overall reputation of another content item (or type).

At decision block 316, the results of sub-process 340 may then be compared to the results of one of block 311, block 310, or the like, to determine whether selectively to hide the display of the content item. If so, then process 300 flows to block 322, where the content item may be selectively hidden. That is, in one embodiment, the abusive content item might be hidden from view by some members of the community of users to the content site, while still visible to specific other users or groups. For example, in one embodiment, the content item might be visible at the content site by the author of the content item. In another embodiment, users determined to be associated with the author might also be able to view the hidden content item. Such users might be determined based on the author's network address, a cookie, a buddy list, contact list, address book, messages between the author and/or other members of the user community, or the like. In this manner, the exposure of the abusive content item to the community may be limited and the time it may take the abusive author to detect the change may be delayed. In one embodiment, this mechanism may also be used to hide a suspicious author's content (including other users that are associated to the same person using multiple accounts) until the content is verified as non-abusive, abusive, or otherwise.

In one embodiment, at block 322, the author might receive a notification that the content item is hidden or removed from the content site. In this manner, the author might be provided an opportunity to appeal the decision. If the author fails to appeal the decision, or acts to remove the content, then the decision that the content item is abusive may be maintained. If the author successfully appeals the decision, the content item might be un-hidden. In any instance, the result of the appeal process, or the fact that the author did not appeal in a timely manner, may be used, as described further below, to modify a reputation of an abuse reporter, a reporter that provided a positive report on the content item, and/or the author's reputation. The result of the appeal process may also be used, in one embodiment, to modify a reputation of at least one user related to the reporter and/or author.

The appeal process may be implemented using any of a variety of mechanisms. In one embodiment, the appeal process may be managed automatically, using surveys, voting, or the like. In another embodiment, the appeal process may include at least some human intervention, such as a through an appeal board, customer care board, administrator review board, arbitration review board, or the like.

If, at decision block 316, it is determined that the content item is not abusive, processing flows to block 320, where the content item may remain visible to the community of users to the content site. In one embodiment, the decision that the content item is abusive might also be used to modify a reputation of an abuse reporter, a reputation reporter that provided a positive report on the content item, the author's reputation, and/or another user.

As shown in the figure, sub-process 340 includes blocks 301-307, and 312, Sub-process 350 includes blocks 308-311, and 314-315. Each of these blocks will now be discussed in more detail, with, in some instances, references to FIGS. 4-7.

At block 312, an abusive confidence reputation is determined based on a level of confidence that a network address or other identifier represents a single user. That is, when a report is received from a user, a user posts content, or the like, or a user visits the content site, information about the user is obtained. In one embodiment, the information might include cookie information, a network address, a client device identifier, a user account identifier, or the like. In one embodiment, activities by the user might be monitored at the content site, to attempt to determine whether the activities appear to be from a single user, or a group of users. The activities might be from a group of users, for example, when several users employ the same client device, when the network address is behind a proxy device which supports multiple users, or when the network address is associated with a sub-network, or the like. Thus, at block 312, a determination is made to attempt to determine a confidence level in whether the actions are by a single person that created multiple accounts or multiple different users. Such information may then be employed by block 301, for example, in determining a reporter's abuse suspicion reputation. The model may be configured however, to avoid collectively punishing innocent users because they share one or more identifiers with one or more abusive persons. In one embodiment, the confidence level that an identifier is used by an abusive person rather than by different users can be represented by the percentage of previously detected abusive users out of the total active users using the same identifier during a specific time period. In one embodiment, proxies and shared devices may be filtered or their reputation is weighed based on their confidence level.

Figure 4:
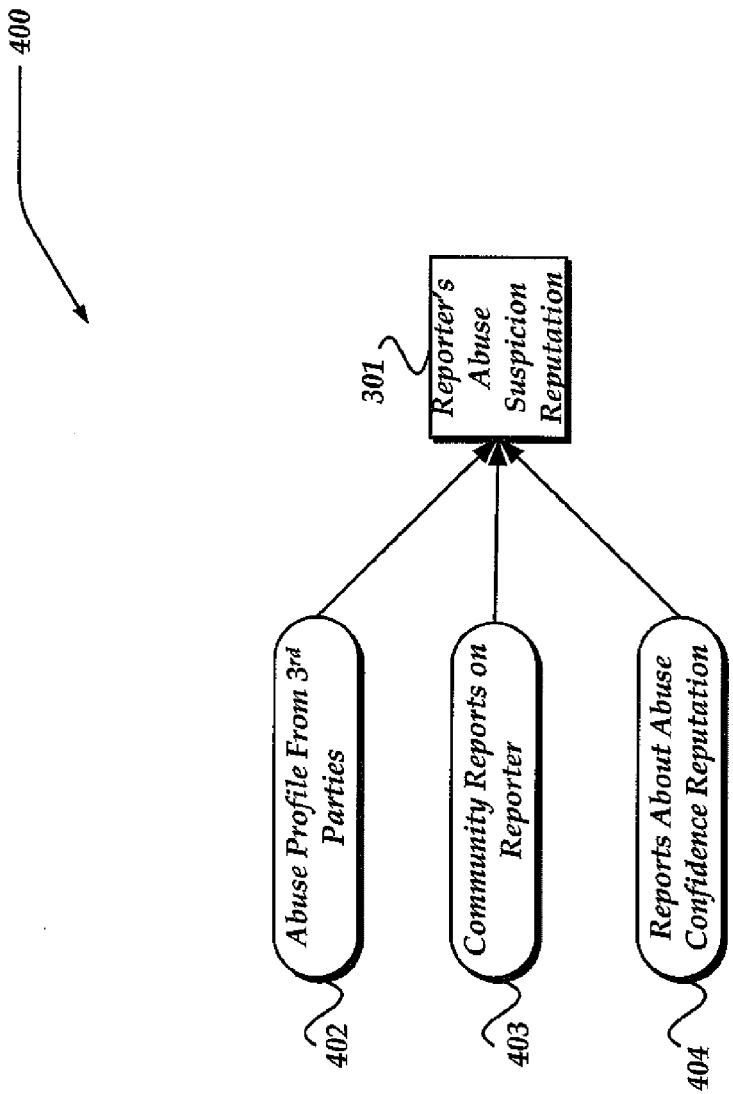
FIG. 4 illustrates a flow diagram generally showing one embodiment of an abuse suspicion object with event inputs.

Block 301 is illustrated in diagram 400 of FIG. 4 and is used to determine a reporter's abuse suspicion reputation. In one embodiment, the reporter's abuse suspicion reputation may be used as an input to abuse reporter bootstrap reputation 304. As illustrated, block 301 may receive a variety of event inputs, including, abuse profile from third parties 402, community reports on reporter 403 including that the user was blocked, ignored, thumbed down, reported by other users, and reports about abuse confidence reputation 404, which may be obtained, from block 312.

Abuse profile from third parties 402 represents inputs from a variety of sources other than the community of users. Machine classification output like spam detection, machine learning, or rules may be used to indicate whether the user is abusive by examining, for example, the user's content, profile info, or avatar image. Thus, if another content site has information about the reporter and shares such information, it may be used to determine the reporter's abuse suspicion reputation. Similarly, if the user community has blocked or ignored the reporter, provided abuse reports about the reporter, voted thumbs down on comments by the reporter in the past, or otherwise provided comments about the reporter, such input may be received through community reports on the reporter 403. As noted, block 301 may also employ information from block 312 to balance whether such actions are related to a single user or multiple users, as seen by input 404 of FIG. 4. Block 301 is not limited to receiving merely the inputs illustrated in FIG. 4, and other inputs may also be used. In any event, block 301 may combine the inputs to determine a value that represents the report's presumed abusive behavior.

Because the inputs to block 301 might be viewed as past behaviors not necessarily directly related to the reporter's current activities of providing an abuse report, the output of block 301 might be seen an providing a low confidence reputation value.

Figure 5:
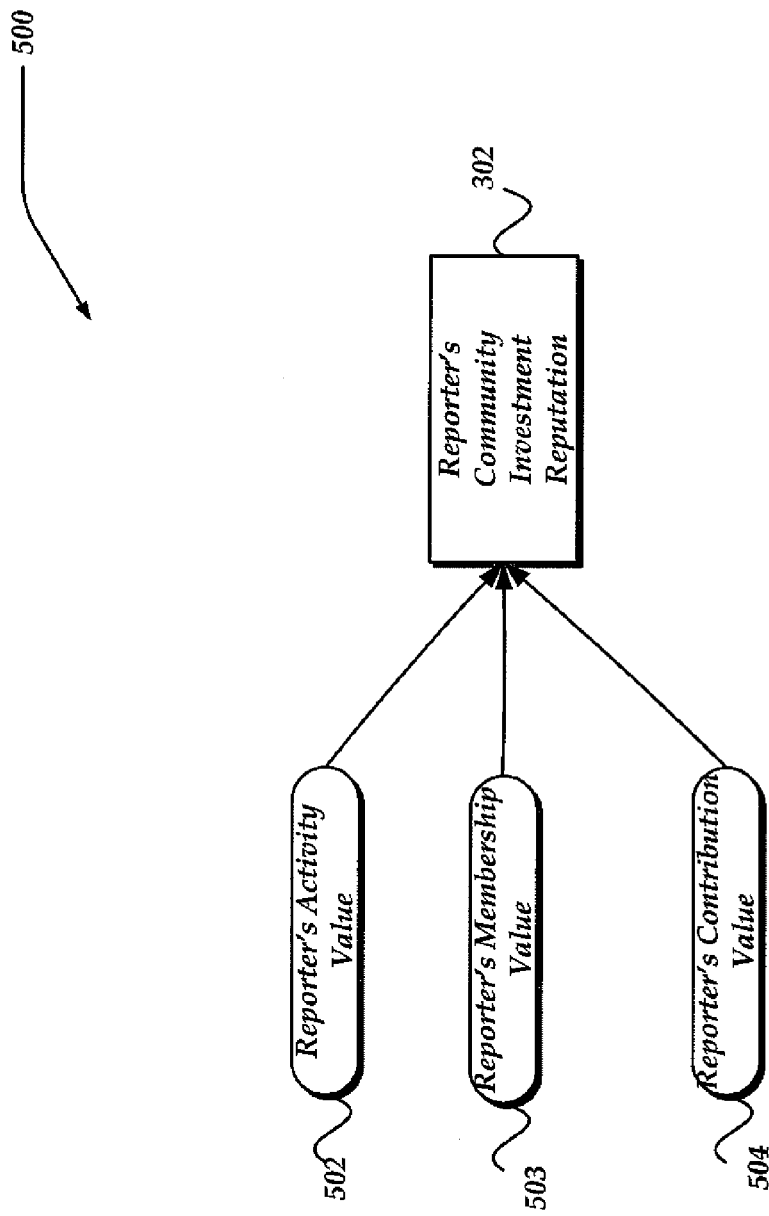
FIG. 5 illustrates a flow diagram generally showing one embodiment of a reporter's community investment reputation with event inputs.

FIG. 5 illustrates a flow diagram 500 generally showing one embodiment of a reporter's community investment reputation 302 with input events. Block 302 represents a reporter's historical investment in the community site. In one embodiment, block 302 may be configured to provide an investment specific to a content topic, such as investing, cooking, or the like or category of content types, such as music content, video content, or the like. Alternatively, block 302 might also provide an overall reporter's community investment reputation based on a variety of activities, by the reporter.

As such, in one embodiment, various inputs may be employed to determine the reporter's community investment reputation, including, but not limited to the reporter's activity value 502 which is directed toward indicating how active the reporter is in the community. For example, a reporter that shares content with other members might have a higher value for input 502 then a reporter that merely reads content.

Another possible input, reporter's membership value 503 attempts to provide a value associated with the reporter's membership duration, including whether the reporter is a new user to the community site, whether the reporter has been a member for some defined time, or the like. For example, if the reporter is determined to be fairly new, input 503 might be a lower value than if the reporter has been a member for several years. Similarly, the reporter's contribution value 504 might also be an input useable to determine the reporter's community investment reputation 302. For example, if the reporter also contributes content to the community site, the reporter might be more valued than a reporter that merely reads content. In one embodiment, such inputs 502-504 might be averaged to determine the reporter's community investment reputation 302; however, the invention is not so limited, and one or more of the inputs 502-504 might be more heavily weighted than another input. Moreover, it should be noted that the invention is not limited to the inputs 502-504 illustrated, and other inputs may also be used to determine a reporter's community investment reputation 302. For example, in one embodiment, a quality level of the reporter's activities might be used as an input, an age, a social status, any financial contributions to the community that the reporter may have made, or any of a variety of other inputs might also be used.

Figure 6:
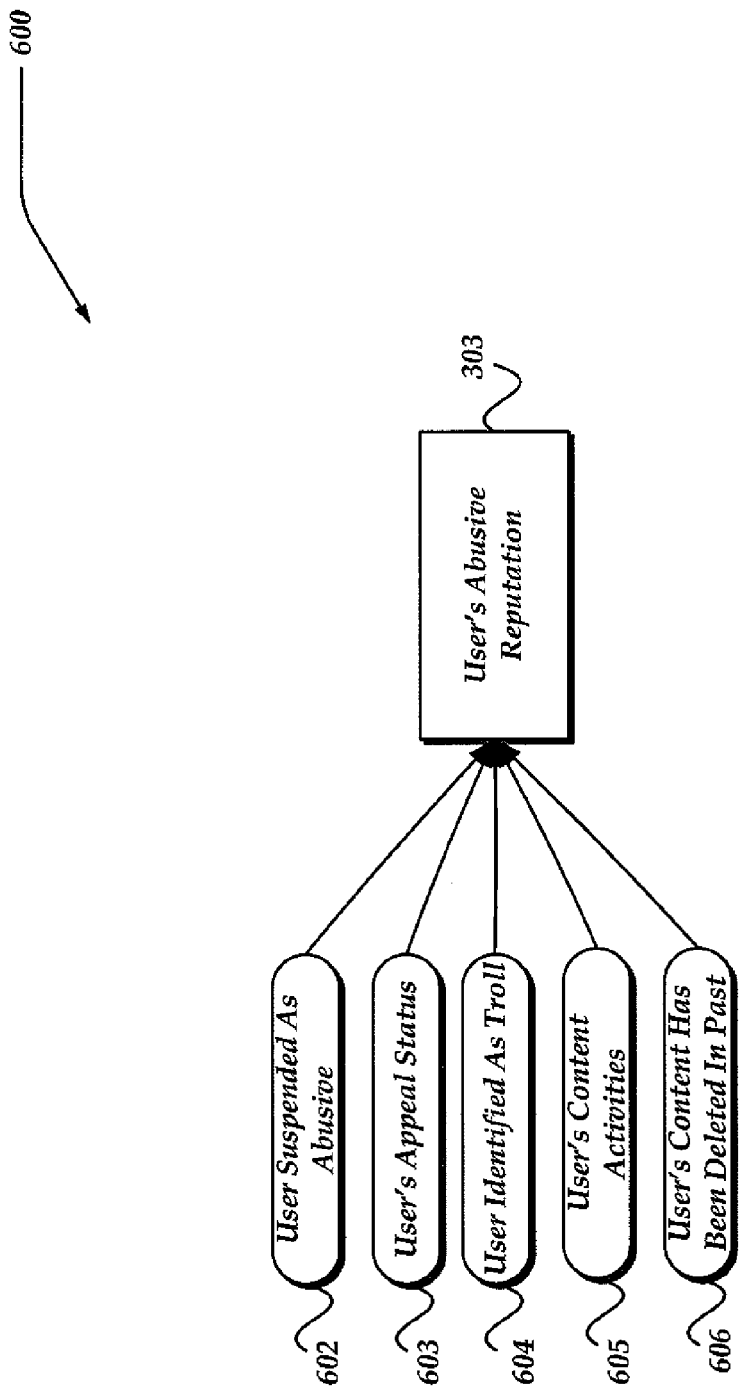
FIG. 6 illustrates a flow diagram generally showing one embodiment of a user's abusive reputation with event inputs.

FIG. 6 illustrates a flow diagram 600 generally showing one embodiment of a user's abusive reputation 303 with event inputs 602-606. The out of block 303 represents a historic, confirmed content related abuse by the user. Thus, the value output by block 303 may be determined to have a high confidence reputation.

As illustrated user's abusive reputation 303 may receive a variety of different inputs, including input indicating whether a user has been suspended as abusive 602, and a status of an appeal process 603 for which the user is associated, whether the user is identified as a troll/spammer or the like 604. Input 605 represents the user's content activities, including, for example, whether the user has edited, deleted, or otherwise modified posted content after it was hidden, or the like. Input 606 represents whether the user's content has been deleted in the past, such as due to an appeal process, by administrators because of violating guidelines or terms of service, a determined reputation, or the like. It should be clear that other abusive activities, actions, or the like, may also be used to determine the user's abusive reputation. Thus, those identified are not intended to limit the invention, but merely to represent possible inputs. The inputs 602-606 may be combined using a variety of mechanisms, including, but not limited to a weighted average, or the like.

Figure 7:
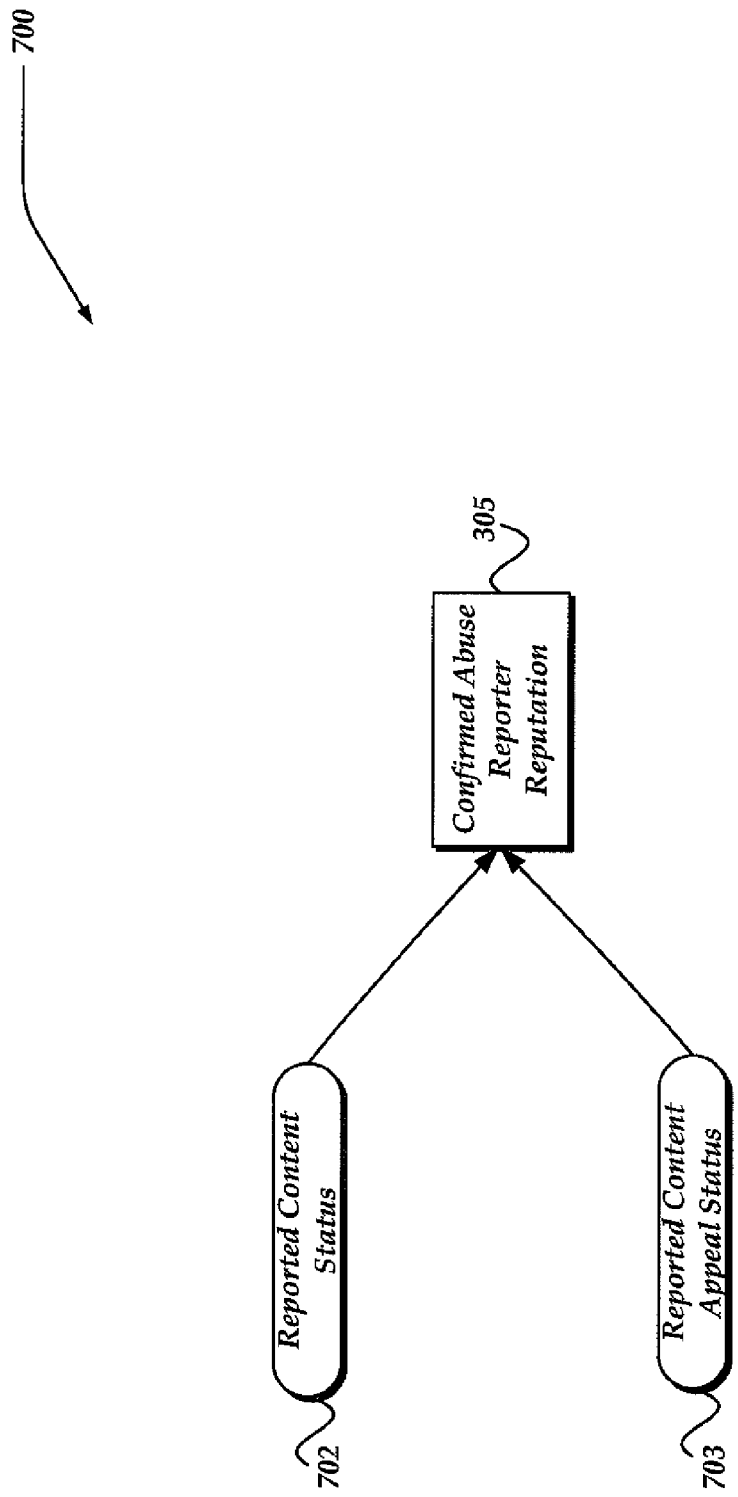
FIG. 7 illustrates a flow diagram generally showing one embodiment of a confirmed abuse reporter's reputation with event inputs.

FIG. 7 illustrates a flow diagram 700 generally showing one embodiment of a confirmed abuse reporter's reputation 305 with event inputs. The events may describe the status of the content items reported by a user (abuse reporter). As shown, block 305 may receive a variety of inputs, including, but not limited to a reported content status 702, and a reported content appeal status 703. Reported content status 702 represents, for example, whether the reported user has deleted content under appeal, or otherwise modified and/or deleted content that is hidden. Reported content appeal status 703 represents, for example, whether the appeal process has expired, whether the result of the appeal process included deleting the content, rejected the appeal, and/or approved the appeal such that the content is to be un-hidden. In one embodiment, such inputs may be averaged, summed, or otherwise combined using a variety of mechanisms, including, but not limited to a weighted summation. Because the inputs to block 305 are based on confirmed actions, the output of block 305 may be considered to be of a high confidence reputation value.

Returning to FIG. 3, it is shown that blocks 301-303 may provide inputs to block abuse reporter bootstrap reputation 304, which represents a reputation value when a user has not yet accumulated a sufficient abuse reporter reputation. A sufficient abuse reporter reputation may be based on a variety of factors, including, for example, whether the user has submitted a defined number of credible abuse reports, a defined number of positive reports, or the like. However, block 304 may also be employed where the user has been a member to the community site for less than a defined amount of time, or any of a variety of other criteria. In any event, at block 304, the inputs 301-303 may be combined using, for example, a weighted average, or using virtually any other mechanism to generate an abuse reporter's bootstrap reputation 304. Thresholds may be used to filter out reports by new users, excessive reporting by a user, network address, device and other criteria.

Block 306 is configured and arranged to determine an abuse reporter's reputation based, in part, on a combination of confirmed (block 305) and/or bootstrap (block 304) values. In one embodiment the confirmed (block 305) reputation value might be used fully when a user has satisfied the sufficient abuser reporter reputation criteria as discussed above. In another embodiment, however, the bootstrap (block 304) reputation value might also be used. In one embodiment, a linear combination of the confirmed (block 305) reputation value and the bootstrap (block 304) reputation value might be used, to generate the abuse reporter's reputation 306.

Block 307 represents an accumulation of all abuse reporters' abuse reporting reputations for a given content item. Thus, in one embodiment, the reputation value generated at block 307 may represent a content item abuse reputation that is determined through reputations of the abuse reporters submitting abuse reports for the content item. It should be noted, however, the block 307 may include other inputs in determining the content item abuse reputation. In one embodiment, machine classifier output, such as spam detector, abusive visual detector, user or device or network address blacklists, or other set of rules, may be used to as an additional input to determine the abusive reputation of a content item. For example, actions taken during the appeal process, including whether the content item is deleted or undeleted, whether the appeal process rejected or approved the appeal, or the like, may also be used to determine the content item abuse reputation. For example, where the appeal process resulted in approving display of the content item, in one embodiment, the accumulated reputations of each reporter of an abuse report for the content item might be ignored.

As noted above, while sub-process 340 is directed towards determining a reputation based, in part, on the abuse reporters' reputations, sub-process 350 is directed towards determining the content item's author's overall content creation reputation.

Thus, blocks 314-315 are configured and arranged to determine content type's 1-N's quality reputation. In one embodiment, a content type might represent a classification of content items, such as movies, restaurants, or the like. However, content types might also represent, in one embodiment, different content items. Thus, for example, content type 1 might represent a particular movie review, while content type N or the like, might represent a review for a different movie. In one embodiment, there may be multiple dimensions. For example, one dimension might be content types, N, while another dimension might be content items per type, M.

In any event, various inputs might be received and combined at block 314-315 based on the content type. For example, such inputs might include, but are not limited to, positive reports from users, actions by users including emailing other users about the content item, saving to favorites, a customer care board's actions on the content type, or the like. In one embodiment, the inputs may be combined using a weighted summation, or other combination.

Blocks 308-309 represent the author's good reputation for a content type. In one embodiment, the reputation value generated at blocks 308-309 might be based on a running average of the outputs of blocks 314-315, respectively. In another embodiment, older events might have a lower weight on the final reputation score. However, in another embodiment, the output value of blocks 308-309 may be modified to account for low volumes of positive inputs, or the like. In any event, the outputs of blocks 308-309 represent the author's good reputation for a given content type.

At blocks 310-311 the author's overall reputation for a content type (1-N) is determined by combining an aggregation of the author's confirmed abusive reputation from block 303 with the aggregation of the author's good reputation for the content item from blocks 308-309.

As noted above a determination of whether or not to hide a content item may then be based on a comparison at decision block 316 of the reputations determined from sub-process 340 and 350. That is, in one embodiment, if the determined content item abuse reputation (from sub-process 340) is equal to or exceeds the determined overall content creation reputation for the author for the content item (from sub-process 350), then the content item may be selectively hidden from display on the content site. Other factors may be used at decision block 316, for example, the author's reputation can be boosted if he was falsely reported before in order to protect him from future false deletions by the community.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks.

In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Alternate Embodiments and Other Considerations

It is understood that as users to the community site learn more about the process used to selectively hide a content item, at least some of the user's actions may change. For example, it is recognized that some users may select to abuse their power. As described above, it is a combined contribution of abuse reporters, an appeal process, and positive reports that are used to automatically determine whether to hide a content item. Moreover, selective abusive actions by users in the community may also be managed using the disclosed invention.

For example, consider a user that falsely reports good content trying to delete it, or a reporting troll that randomly reports a large quantity of content. For such users, the model disclosed above may be configured to not weight a new user's input for some defined time period. Moreover, abusive users will have their reputations diminished over time, such that their reports will not be trusted, or may be completely ignored by the model.

Similarly, where a user creates multiple accounts and uses them to falsely report content, or creates puppet accounts and used them to post abusive content may also be addressed by the above model. As noted above, reports, as well as various other activities by users may be monitored, and associated with network addresses, or other identifiers. Such information may then be correlated to determine whether the abuse is from a single user or multiple different users. The information may then be employed to modify the reputation of the abusive user.

Where a user with a high reputation value falsely reports good content of another user, such situations may also be managed by the above model. For example, by employing the appeal process, and modifying reputations of users based, in part, on the result of the appeal process, the user with the high reputation may end up with a 'tarnished' reputation. Similarly, the targeted author might enjoy limited protection based on an increased reputation. Such examples are just a few possible attempted misuses a user might perform on a community site. However, the model is configured to address at least these abuses, as well as others. Thus, the model should not be considered to be limited to these abuses, and others are considered and addressed by the model as well.

Older events may have less relevancy as newer events since users may change their behaviors over time. In one embodiment, time decay may be applied to events and/or reputations. Older events will have less weight on reputations scores. In another embodiment, reputations may be decayed based on their last update time.

The above specification, examples, and data provide a complete description of the manufacture and use of the composition of the invention. Since many embodiments of the

What is claimed as new and desired to be protected by Letters Patent of the United States is:

1. A network device for selectively managing display of content items on a content system over a network, comprising:
   a transceiver to send and receive data over the network; and
   a processor that is operative to perform actions, including:
      receiving at least one abuse report from a plurality of abuse reporters indicating that a content item is considered to be abusive by each reporter;
      determining a content item abuse reputation based, in part, on an accumulation of determined reputations for each reporter of the received at least one abuse report for the content item;
      determining for an author of the content item an overall content creation reputation for the content item; and
      selectively hiding a display of the content item on the content system based on a comparison between the determined content item abuse reputation and the determined overall content creation reputation for the author for the content item, wherein selectively hiding the display of the content item on the content system further comprises inhibiting display of the content item on the content system to at least one visitor to the content system, while enabling at least the author of the content item to view the display of the content item on the content system.

2. The network device of claim 1, wherein determining an overall content creation reputation for the author for the content item further comprises:
   determining an aggregation of the author's reputation for the content item based, in part, on a reporter's input;
   determining an aggregation of the author's confirmed abusive reputation; and
   determining the overall content creation reputation for the author for the content item by combining the determined aggregation of the author's reputation with the determined aggregation of the author's confirmed abusive reputation.

3. The network device of claim 1, wherein determining the content item abuse reputation further comprising:
   determining an abuse reporter's reputation for each reporter of an abuse report for the content item based in part on at least one of a confirmed abuse reporter reputation or an abuse reporter bootstrap reputation determination; and
   combining the determined abuse reporter's reputations for each reporter to determine the accumulated abuse reporter reputation.

4. The network device of claim 3, wherein the bootstrap reputation determination further comprises:
   determining for each reporter an abuse suspicion reputation;
   determining for each reporter an historical investment in the content system;
   determining for each reporter a confirmed abusive reputation; and
   combining at least one of the abuse suspicion reputation, the historical investment, or the confirmed abusive reputation to determine a bootstrap reputation for each reporter.

5. The network device of claim 3, wherein the confirmed abuse reporter reputation further comprises determining the confirmed abuse reporter reputation based, in part, on at least one of a status of an appeal by the author for the content item, or a status of the display of the content item on the content system.

6. The network device of claim 3, wherein the abuse suspicion reputation is determined based, in part, on a detected activity for each reporter at the content system.

7. A method for use in managing display of content at a content system over a network, comprising:
   receiving at least one abuse report from each of a plurality of abuse reporters indicating that each abuse reporter considers a display of a content item on the content system to be abusive, in violation of terms of service or guideline, inappropriate, or illegal;
   determining an accumulated abuse reporters' reputation for the content item based, in part, on reputations of each abuse reporter of the received at least one abuse report;
   determining a reputation of an author of the content item;
   selectively hiding a display of the content item on the content system based on a result of a comparison between the determined reputation of the author for the content item and the determined accumulated abuse reporters' reputation;
   if the content item is determined to be selectively hidden, notifying the author of the content item of an availability of an appeal process;
   receiving a request from the author of the content item to employ the appeal process; and
   employing an outcome of the appeal process to modify at least one of a reputation of at least one abuse reporter or the reputation of the author of the content item.

8. The method of claim 7, wherein determining the reputation of the author of the content item further comprises:
   determining the reputation of the author based on a comparison of an aggregation of the author's confirmed abusive reputation to an aggregation of the author's positive reputation based on positive input from at least one user of the content system; and
   if the author is determined to be a new user to the content system, modifying the determined reputation of the author to induce an initial positive reputation of the author for the content item.

9. The method of claim 8, wherein determining the accumulated abuse reporters' reputation further comprises:
   determining a reputation of each abuse reporter based, in part, on a confirmed abuse reporter reputation that is determined based on at least one of a status of an appeal for another content item in which the reporter provided an abuse report or a positive report, or an activity of a customer care for the other content item in which the reporter provided the abuse report or the positive report.

10. The method of claim 9, wherein determining the reputation of each abuse reporter further comprises:
   determining an abuse reporter bootstrap reputation for each abuse reporter based, in part, on at least one of a confirmed abuse reporter abusive reputation, and determined community investment reputation for the respective abuse reporter; and
   determining the reputation for the respective abuse reporter based on at least one of the abuse reporter bootstrap reputation and the confirmed abuse reporter reputation.

11. The method of claim 7, wherein determining a reputation for each abuse reporter further comprises employing, for each respective abuse reporter, at least one of an outcome of a previous abuse report by the respective abuse reporter, an investment in a community for the content system by the respective abuse reporter, or an abusive behavior by the respective abuse reporter.

12. The method of claim 7, wherein selectively hiding of the display of the content item at the content system further comprises enabling at least the author of the content item to view the display of the content item at the content system, while inhibiting display of the content item at the content system to another user of the content system.

13. A system for use in managing display of content over a network, comprising:
- a content server configured and arranged to display submitted content items; and
- reputation service configured and arranged to receive at least one of an abuse report or a positive report for at least one user generated content item, and to perform actions, including:
  - determining a content item abuse reputation based, in part, on an accumulation of determined reputations for each abuse reporter of a plurality of abuse reporters providing an abuse report for the content item;
  - determining for an author of the content item an author reputation for the content item;
  - selectively hiding a display of the content item on the content system based on a result of a comparison between the determined content item abuse reputation and the determined author reputation for the content item; and
  - if it is determined that the author of the content item to be selectively hidden is a repeat abusive author, enabling deletion of each content item automatically from the content server, absent notification to the author.

14. The system of claim 13, wherein determining the author reputation further comprises:
- determining an author's good reputation for the content item based, in part, on at least one positive report for the content item;
- determining an author's abusive reputation based, in part, on activities by the author that are confirmed by at least one customer care entity or administrator; and
- combining the author's determined good reputation with the author's determined abusive reputation to determine the author reputation for the content item.

15. The system of claim 13, wherein determining reputations for each abuse reporter further comprises combining at least one of a status of an appeal process for another content item in which the respective abuse reporter submitted an abuse report, or a status of another content item in which the respective abuse reporter submitted an abuse report with an abusive reputation of the respective abuse reporter.

16. The system of claim 13, wherein determining reputations for each abuse reporter further comprises determining an abuse reporter bootstrap reputation based in part on network activities determined to be abusive by network addresses determined to be related to a network address of the respective abuse reporter.

17. The system of claim 13, wherein the reputation service is configured to perform actions, further comprising:
- providing an appeal process to the author of the content item;
- receiving a request from the author of the content item to employ the appeal process; and
- employing an outcome of the appeal process to modify at least one of the determined accumulated abuse reporter reputation or the author reputation.

18. The system of claim 13, wherein a determined reputation for each abuse reporter further comprises:
- determining a confidence level that a report is associated with a single abuse reporter as opposed to a plurality of reporters based on a percentage of previously detected abusive users out of a total of active users using a same identifier during a defined time period; and
- employing the confidence level to modify the determined reputation for a respective abuse reporter.

* * * * *